United States Patent [19]

Heflinger et al.

[11] 3,801,931
[45] Apr. 2, 1974

[54] SINGLE MODE LASER OSCILLATOR WITH LINEAR RESONATOR AND INTERNAL FARADAY ISOLATOR

[75] Inventors: Lee O. Heflinger, Torrance; Ralph F. Wuerker, Palos Verdes Estates, both of Calif.

[73] Assignee: TRW Inc., Redondo Beach, Calif.

[22] Filed: Nov. 30, 1972

[21] Appl. No.: 310,869

[52] U.S. Cl. .............................................. 331/94.5
[51] Int. Cl. ............................................. H01s 3/02
[58] Field of Search .................................. 331/94.5

[56] References Cited
UNITED STATES PATENTS

| | | | |
|---|---|---|---|
| 3,456,210 | 7/1969 | Statz et al. | 331/94.5 |
| 3,523,718 | 8/1970 | Crow | 331/94.5 |
| 3,584,312 | 6/1971 | Statz | 331/94.5 |
| 3,646,468 | 2/1972 | Buczek et al. | 331/94.5 |
| 3,691,477 | 9/1972 | Janney | 331/94.5 |

*Primary Examiner*—William L. Sikes
*Attorney, Agent, or Firm*—Donald R. Nyhagen; Edwin A. Oser; Daniel T. Anderson

[57] ABSTRACT

A standing lightwave within the active lasing medium of a laser oscillator is avoided to prevent periodic bleaching of the medium and thereby foster single mode oscillation and improve coherence. A Faraday isolator and an optical rotator located within the opposite end regions of the laser resonator cavity, between the lasing medium and cavity end reflectors, changes the direction of polarization of the coherent light propagating through these cavity regions and blocks oscillation of light which propagates from the lasing medium with other than certain favored directions of polarization in such a way that the oppositely traveling lightwaves within the lasing medium have mutually perpendicular planes of vibration and hence do not interfer to produce a standing wave in the medium. The oppositely traveling lightwaves within one end of the resonator cavity establish a standing wave region in which may be located a bleachable mode selector, such as a dye cell, for suppressing undesired oscillating modes and thereby further improving coherence.

13 Claims, 6 Drawing Figures

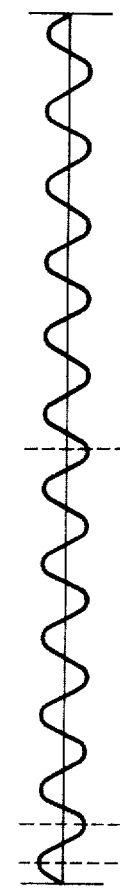
*Fig. 1D* STANDING WAVE OF SECOND OSCILLATING MODE
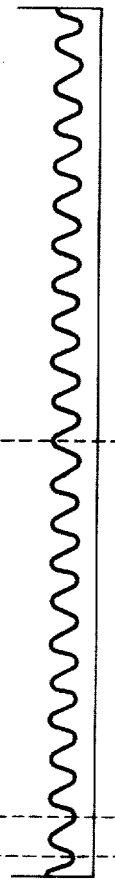
*Fig. 1C* INVERTED POPULATION WHEN ONLY FIRST MODE OSCILLATES
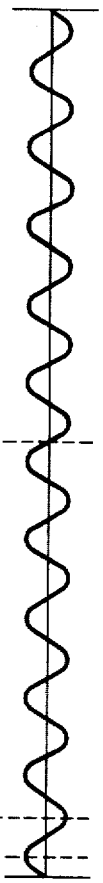
*Fig. 1B* STANDING WAVE OF FIRST OSCILLATING MODE
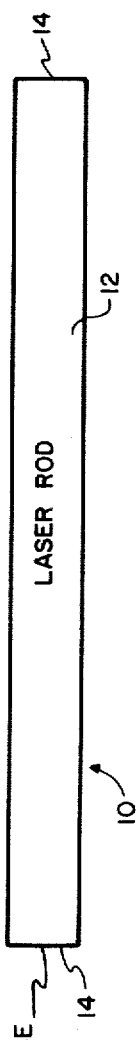
*Fig. 1A* SILVERED END FACE (BOTH ENDS)
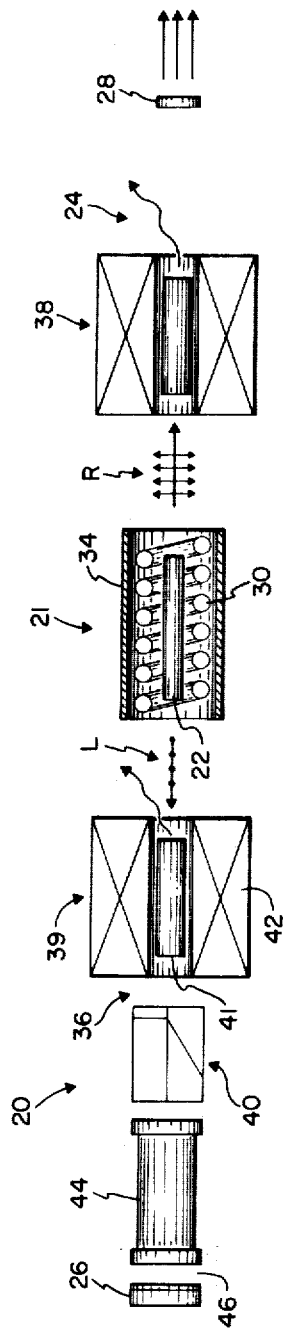
*Fig. 2*

SINGLE MODE LASER OSCILLATOR WITH LINEAR RESONATOR AND INTERNAL FARADAY ISOLATOR

RELATED APPLICATIONS

Reference is made to copending applications entitled "SINGLE MODE LASER OSCILLATOR WITH RING RESONATOR CONTAINING MODE SELECTOR," filed Nov. 30, 1972, Ser. No. 310,868; and "SINGLE MODE LASER OSCILLATOR WITH RING RESONATOR AND INTERNAL FARADAY ISOLATOR," filed Nov. 30, 1972, Ser. No. 310,868; and assigned to the same assignee as this application.

BACKGROUND OF THE INVENTION

1. Field of the Invention

This invention relates generally to laser oscillators and more particularly to a method of and means for avoiding a standing lightwave in the active lasing medium of a laser oscillator to prevent periodic bleaching of the medium and thereby promote single mode oscillation and improve coherence.

2. Prior Art

It is well-known that in the absence of any mode selection or control means, the coherent light from the active laser oscillator is composed of a plurality of discrete frequency components or longitudinal modes which are distributed over the frequency range or lasing line width of the lasing medium. Such multiple longitudinal modes reduce the temporal coherence or coherence length of the laser beam. This coherence length may be defined as the maximum path length difference which two laser beams from the same source may be mismatched and still interfere.

Coherence length is unimportant in some laser applications. In other applications, on the other hand, notably holography, high coherence, that is relatively long coherence length, is either highly desirable or absolutely essential. For this reason, laser oscillators which are used in these high coherence applications are equipped with means, commonly referred to as mode selectors or controllers, for suppressing all but a most favored oscillating mode. Well-known examples of mode controllers are etalons and saturable absorbers, such as dye cells.

The mode controlling actions of etalons and dye cells are well understood and hence need not be explained in detail. Suffice it to say that etalons effect mode control by a light wave interference action and saturable absorbers by a periodic bleaching action produced by the most favored longitudinal mode. This bleaching action lowers the loss for the favored mode but retains the loss for other modes relatively high.

While such mode controllers improve coherence, certain lasing mediums, particularly solid-state lasers such as ruby lasers, experience periodic de-inversion or de-population, referred to herein as periodic bleaching, which promotes multi-mode oscillation and reduces coherence. In other words, such lasing mediums act as anti-coherence elements. This anit-coherence action is explained, for example, on pages 273 - 282 of Volume 10a, entitled "Lasers-A Collection of Reprints with Commentary" of the International Science Review Series, published in 1968 by Gordon and Breach, Science Publishers, New York. Accordingly, it is unnecessary to explain the action in great detail. Suffice it to say that the anti-coherence action results from the fact that the light waves of an initial oscillating mode traveling in opposite directions through the lasing medium of a conventional laser oscillator have parallel planes of vibration and hence create a standing light wave in the medium. This standing light wave causes periodic bleaching, i.e. de-population, of the medium by induced emission which varies between a minimum at the nodes and a maximum at the anti-nodes of the standing wave. Accordingly, the inverted population varies between a maximum at the nodes and a minimum at the anti-nodes. This inverted population distribution is most unfavorable for the initial oscillating mode and tends to foster other modes which may commence and thus destroy mode control.

It will now be understood, therefore, that effective single mode operation of a laser oscillator requires not only mode selection or control to suppress undesired longitudinal oscillating modes, but also avoidance of a standing wave in the lasing medium which would cause periodic bleaching of the medium.

The earlier mentioned reference from the Science Review Series describes a solid-state traveling wave laser oscillator which avoids a standing wave in the laser crystal and thereby periodic bleaching of the crystal. Simply stated, this traveling wave laser has a ring resonator containing a Faraday isolator which permits propagation of light waves in only one direction through the resonator cavity. Accordingly, light wave propagation occurs essentially in only one direction through the laser crystal, thus avoiding the formation of a standing wave in the crystal and producing uniform bleaching of the crystal.

SUMMARY OF THE INVENTION

The laser oscillator of this invention is characterized by light wave propagation in both axial directions through the lasing medium without creation of a standing wave in the medium and hence without periodic bleaching of the medium which would foster multiple oscillating modes. The laser oscillator includes a lasing medium contained within an optical resonator cavity with end reflectors defining the cavity ends and pumping means for the lasing medium. When pumped to its excited state, the medium produces plane polarized coherent light which, for convenience of discussion, is considered to be horizontally polarized.

According to the present invention, a Faraday isolator and an optical polarization changing means are located in opposite ends of the resonator cavity between the lasing medium and the cavity end reflectors. The optical means changes the direction of polarization of the light waves traveling from the lasing medium to the adjacent reflector and back to the medium through a total angle of 90°. For this reason, the optical means is hereafter referred to as an optical rotator.

The Faraday isolator includes a Faraday rotator and an optical polarizer between this rotator and the adjacent cavity end reflector. The Faraday rotator changes the direction of polarization of light waves passing through it to the adjacent cavity end reflector through 45° in one direction of rotation and through an additional 45° angle in the same direction of rotation during return passage of the reflected light waves through the rotator to the lasing medium. Accordingly, horizontally polarized light waves entering the Faraday rotator from the lasing medium emerge from the rotator toward the adjacent cavity end reflector with their plane of vibration rotated 45° from the entering waves and are then reflected back to the rotator in this vibration plane. In other words, the oppositely traveling light waves within the region between the Faraday rotator and the adjacent reflector have a common plane of vibration. The polarizer of the Faraday isolator is located within this region with its light transmission plane parallel to the common vibration plane of these oppositely traveling waves.

During operation of the laser oscillator, horizontally polarized light waves propagating from the lasing medium through the Faraday isolator are reflected back through the medium in a vertical plane of vibration. During subsequent propagation of these vertically polarized waves from the lasing medium through the optical rotator to the adjacent cavity end reflector and back through the optical rotator to the medium, the latter waves are rotated back to a horizontal plane of vibration. On the other hand, horizontally polarized light waves which propagate from the lasing medium through the optical rotator are reflected back through the medium in a vertical plane of vibration. These vertically polarized waves are rotated through a 45° angle by the Faraday rotator and are then reflected from the optical cavity by the optical polarizer. Thus, only horizontally polarized waves traveling in one direction are able to remain in the cavity and recirculate. Accordingly, the oppositely traveling light waves within the lasing medium, which are amplified by reflection through the lasing medium, have mutually perpendicular planes of vibration and hence do not establish a standing wave in the medium. Periodic bleaching of the medium is thus avoided to promote single mode oscillation and improve coherence.

The oppositely traveling, parallel polarized waves in the region between the optical polarizer and the adjacent cavity end reflector establish a standing wave in this region. If desired, a mode selector, such as a chlorophyll dye cell, may be placed in this region to suppress undesired oscillating modes and thereby further improve coherence.

BRIEF DESCRIPTION OF THE DRAWINGS

FIGS. 1A through 1D depict the anti-coherence action of the lasing medium in a conventional laser oscillator;

FIG. 2 illustrates an improved single mode laser oscillator according to the invention.

DESCRIPTION OF THE PREFERRED EMBODIMENTS

Figure 3:
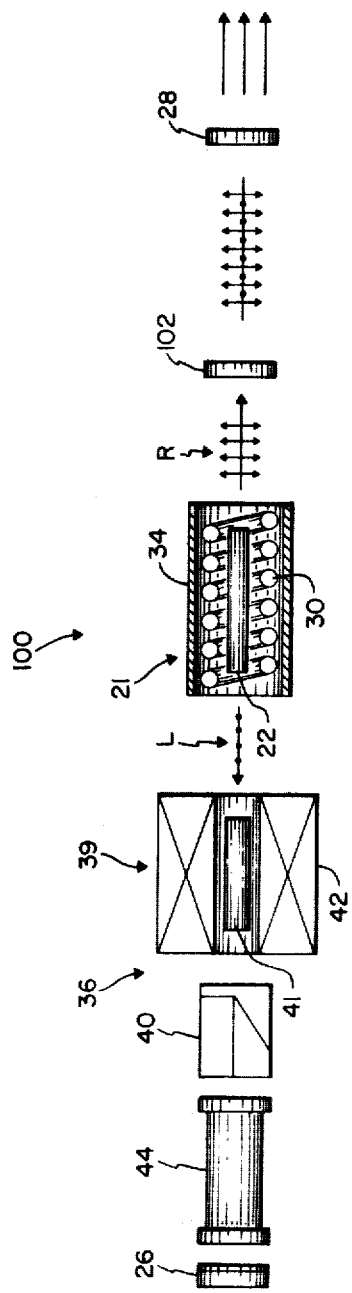
FIG. 3 illustrates a modified single mode laser oscillator according to the invention.

FIG. 1A illustrates a conventional laser oscillator 10 having an active lasing medium 12, in this case a solid-state medium, such as a ruby rod, with silvered end faces 14. The pumping means for the lasing medium has been omitted for clarity. During operation of the laser oscillator, plane polarized coherent light is reflected back and forth between the end faces 14, resulting in oppositely traveling light waves in the medium. These light waves have parallel planes of vibration and assuming the existence of a single initial oscillating mode, give rise to a standing light wave (FIG. 1B) in the medium. The induced emission produced by this standing wave varies between a minimum, i.e. zero, at the nodes and a maximum at the anti-nodes of the standing wave, thus causing corresponding periodic bleaching of the lasing medium and creating the inverted population distribution of FIG. 1C.

It will be observed that the resulting inverted population density varies between a maximum at the nodes and a minimum at the anti-nodes of the standing wave. This inverted population distribution is obviously unfavorable to the initial oscillating mode which created the distribution and favors other longitudinal modes, particularly that of FIG. 1D whose electric field has a maximum coinciding with a maximum of the inverted population density at the center of the lasing medium. This second mode will thus have more gain than the initial mode and hence will go into oscillation. The two oscillating modes will then produce a new standing wave in the lasing medium which will cause corresponding periodic bleaching of the medium favoring initiation of a third oscillating mode. Additional oscillating modes may be initiated by repetition of this action, resulting in multi-mode operation of the laser oscillation.

The lasing medium in a conventional laser oscillator thus fosters multiple oscillating modes. As noted earlier, and is well known to those versed in the art, such multiple modes reduce the coherence length of the oscillator which is undesirable or totally unacceptable for certain laser applications, such as holography. In other words, the lasing medium acts as an anti-coherence element.

The laser oscillator of this invention is designed to suppress or eliminate this anti-coherence action. Turning to FIG. 2, the illustrated laser oscillator 20 has a laser 21 including a lasing medium 22, in this case a solid-state lasing medium such as a ruby rod, contained within an optical resonator cavity 24. Cavity 24 has end reflectors 26, 28 defining the cavity ends and having their reflective faces on and normal to the axis of the laser rod 22. Surrounding the laser rod is an optical pumping means 30, such as a helical xenon flash lamp, surrounded by a cylindrical reflector 34. Reflector 26 is a 99° percent reflector and reflector 28 is the output reflector.

Located between the ends of the laser rod 22 and the end reflectors 26, 28 are a Faraday isolator 36 and an optical polarization changing element 38, referred to herein as an optical rotator. The coherent plane polarized light propagating from the laser rod 22 passes through the Faraday isolator and the rotator during propagation to the adjacent end reflector and again during reflection back to the rod. Rotator 38 changes the direction of polarization of the light in such a way that the polarization direction of the reflected light returned to the laser rod 22 is rotated 90° relative to the polarization direction of the light propagating from the rod.

Faraday isolator 36 includes a Faraday rotator 39 and an optical polarizer 40 between this rotator and the adjacent cavity end reflector 26. Faraday rotator 39 includes a rod 41 of transparent Faraday material, such as lead glass with a high Verdet constant, and an electrical coil 42 surrounding the Faraday rod. Coil 42 is energized to create within the Faraday rod a magnetic field which changes the polarization direction of light 45° in one direction during left-hand passage of the light through the Faraday rod to end reflector 26 and an additional 45° in the same direction during right-hand reflection of the light back through the rod. Under certain circumstances a permanent magnet may be used to create the magnetic field instead of the electromagnet.

Assume now that the laser rod 22 when pumped, produces horizontally polarized coherent light, and consider left traveling, horizontally polarized light waves L propagating from the left end of the laser rod toward the Faraday rotator 39. During their passage through the rotator, the plane of vibration of these waves is rotated 45° in one direction. Assuming, for the moment, that the polarizer 40 is not present, the waves travel to the left in this 45° plane to the cavity end reflector 26 and are then reflected back to the Faraday rotator in the same plane. During the return passage of the reflected waves through the Faraday rotator, their plane of vibration is rotated an additional 45° in the same direction. Accordingly, the light waves are returned to and travel to the right through the laser rod 22 in a vertical plane of vibration. These right traveling vertically polarized light waves are designated by the reference character R in FIG. 2.

The right traveling vertically polarized waves R propagate from the right end of the laser rod 22 and travel to the right through the optical rotator 38 to the cavity end reflector 28 and are then reflected back through the rotator to the rod. During this transit of the waves from the laser rod to the reflector and back to the rod, their plane of vibration is rotated 90°. Accordingly, the waves are returned to and travel to the left through the laser rod in a horizontal plane of vibration to repeat the cycle.

It is evident at this point, therefore, that if one considers only the horizontally polarized light waves propagating initially from the left end of the rod, the resulting right and left traveling waves within the laser rod which are amplified by repetitive passage or reflection through the laser rod 22, have mutually perpendicular planes of vibration. Accordingly, these oppositely traveling waves do not produce a standing wave in and resulting periodic bleaching of the rod.

However, horizontally polarized light waves also propagate from the right end of the laser rod 22. These right traveling horizontally polarized waves are rotated 90° to a vertical plane of vibration during their travel from the laser rod, through the rotator 38, to the cavity end reflector 28 and back through the rotator to the laser rod. In other words, the horizontally polarized waves propagating from the right end of the laser rod 22 establish left traveling vertically polarized waves within the rod. These left traveling vertically polarized waves, if allowed to amplify, would interfere with the right traveling vertically polarized waves in the laser rod to produce a standing wave which would cause periodic bleaching of the rod and thereby foster multiple oscillating modes and reduce coherence.

The formation of this standing wave is prevented by the polarizer 40 of the Faraday isolator 36. This polarizer, which may be a glan polarizer, is located in the region between the Faraday rotator 39 and the adjacent cavity end reflector 26. It will be recalled from the earlier discussion that the left traveling horizontally polarized light waves L result in oppositely traveling light waves in this region having a common plane of vibration, inclined at a 45° angle to the horizontal plane. The maximum light transmission plane of the polarizer 40 is oriented to coincide with this common vibration plane of the oppositely traveling waves. Accordingly, the polarizer transmits the left traveling horizontally polarized waves L from the laser rod 22 to the end reflector 26 and back to the rod. The left traveling vertically polarized waves, on the other hand, are rotated 45° into the reflection plane of the polarizer 40 during their passage through the Faraday rotator and are thus reflected from the laser cavity 24 by the polarizer. Accordingly, the oppositely traveling light waves within the laser rod 22 which are amplified by repeated reflection through the rod have mutually perpendicular planes of vibration and hence do not create a standing wave in the rod. Periodic bleaching of the rod is thus avoided and coherence is improved.

If desired, the laser oscillator may be provided with mode selection or control means for aiding the described anti-standing wave action of the invention in achieving single mode oscillation. The illustrated laser oscillator, for example, has a saturable absorber 44 within the cavity region 46 between the cavity and reflector 26 and polarizer 40. The oppositely traveling parallel polarized waves in this region produce a standing wave which periodically bleaches the dye cell 48 to effect a mode controlling or selecting action for suppressing undesired oscillating modes. The output reflector 28 may be a sapphire resonant reflector which also effects a mode controlling action in a well-known manner by interference phenomena.

In the laser oscillator of FIG. 2, the right-hand optical rotator 38 is a second Faraday rotator which operates to change the direction of polarization in the same manner as the Faraday rotator 39. The modified laser oscillator 100 of FIG. 3 is identical to that of FIG. 2 except that the right-hand Faraday rotator has been replaced by a quarter wave plate 102. This wave plate converts right traveling vertically polarized waves R propagating from the laser rod 22 to circularly polarized waves and then converts these circularly polarized waves to the horizontally polarized left traveling waves L during reflection of the waves from the output reflector 28 back through the rotator to the laser rod. The operation of the laser oscillator 100 is otherwise identical to that of FIG. 2.

What is claimed as new in support of letters Patent is:

1. A high coherence laser oscillator having a non-standing wave gain region, comprising:
a lasing medium which produces plane polarized coherent light having a given plane of vibration;
an optical cavity containing the medium and including end reflectors;
means for pumping said medium;
means for changing the direction of polarization of the coherent light propagating from each end of said medium during travel of the light from the medium to the adjacent and reflector and back to the medium in a manner such that the polarization direction of the reflected light returned to the medium is rotated 90° relative to the polarization direction of the light propagating from the medium; and
means for blocking reflection through said medium of light propagating from one end of said medium in planes of vibration other than said given plane, whereby the oppositely traveling light waves in said medium have mutually perpendicular planes of vibration and said medium is substantially devoid of a standing light wave.

2. A laser oscillator according to claim 1 wherein:
the oppositely traveling light waves in one end region of said cavity create a standing light wave in said region; and
a saturable absorber in said standing wave region to suppress undesired oscillating modes.

3. A high coherence laser oscillator with a non-standing wave gain region comprising:
an active lasing medium for producing plane polarized coherent light having a given plane of vibration;
means for pumping said medium;
an optical cavity containing said medium including end reflectors;
an optical rotator between said medium and each reflector for changing the direction of polarization of the coherent light-beam from the adjacent end of the medium during transit of the beam from the medium to the adjacent reflector and back to the medium in a manner such that the polarization direction of the reflected beam returned to the medium is rotated 90° relative to the polarization direction of the beam propagating from the medium;

one rotator comprising a Faraday rotator;
an optical polarizer in said cavity for blocking reflection through said medium of light propagating from one end of said medium in planes of vibration other than said given plane, whereby the oppositely traveling light waves in said medium have mutually perpendicular planes of vibration and said medium is substantially devoid of a standing light wave.

4. A laser oscillator according to claim 3 wherein:
said lasing medium is a solid-state lasing medium such as a ruby.

5. A laser oscillator according to claim 3 wherein:
the other rotator is a Faraday rotator.

6. A laser oscillator according to claim 3 wherein:
the other rotator is a quarter wave plate.

7. A laser oscillator according to claim 3 including:

mode control means in said cavity for suppressing undesired oscillating modes.

8. A laser oscillator according to claim 7 wherein:
said mode control means comprises a dye cell between said polarizer and the adjacent reflector.

9. A laser oscillator according to claim 3 wherein:
said lasing medium is a solid lasing medium such as a ruby; and
said oscillator includes a mode controlling dye cell between said polarizer and adjacent reflector.

10. A laser oscillator according to claim 9 wherein:

the other rotator is a Faraday rotator.

11. A laser oscillator according to claim 9 wherein:

the other rotator is a quarter wave plate.

12. The method of avoiding a standing light wave within the active lasing medium of a laser oscillator having an optical cavity containing the medium and end reflectors, said medium producing plane polarized coherent light having a given plane of vibration, comprising the steps of:
pumping said medium to cause the medium to lase;

changing the direction of polarization of the coherent light propagating from each end of said medium during travel of the light from the medium to the adjacent end reflector and back to the medium in a manner such that the polarization direction of the reflected light returned to the medium is rotated 90° relative to the polarization direction of the light propagating from the medium;
blocking reflection through said medium of light propagating from one end of said medium in other than said given vibration plane, whereby the oppositely traveling light waves in said medium have mutually perpendicular planes of vibration and said medium is substantially devoid of a standing light wave.

13. The method according to claim 12 wherein:
the oppositely traveling light waves in one end region of said cavity create a standing light wave in said region; and
said method includes the further step of exposing a saturable absorber to said standing wave to suppress undesired oscillating modes.

* * * * *

UNITED STATES PATENT OFFICE
CERTIFICATE OF CORRECTION

PATENT NO. : 3,801,931
DATED : April 2, 1974
INVENTOR(S) : Lee O. Heflinger et al It is certified that error appears in the above-identified patent and that said Letters Patent are hereby corrected as shown below:

Column 1, line 13, change "Ser. No. 310,868" to

--Ser. No. 310,857--

Signed and Sealed this

Twenty-eighth Day of December 1976

[SEAL]

Attest:

RUTH C. MASON
*Attesting Officer*

C. MARSHALL DANN
*Commissioner of Patents and Trademarks*